Jan. 10, 1939.  C. J. KINZIE ET AL  2,143,013
ZIRCONIUM CARBOXIDE AND METHOD OF MAKING SAME
Filed Aug. 7, 1935
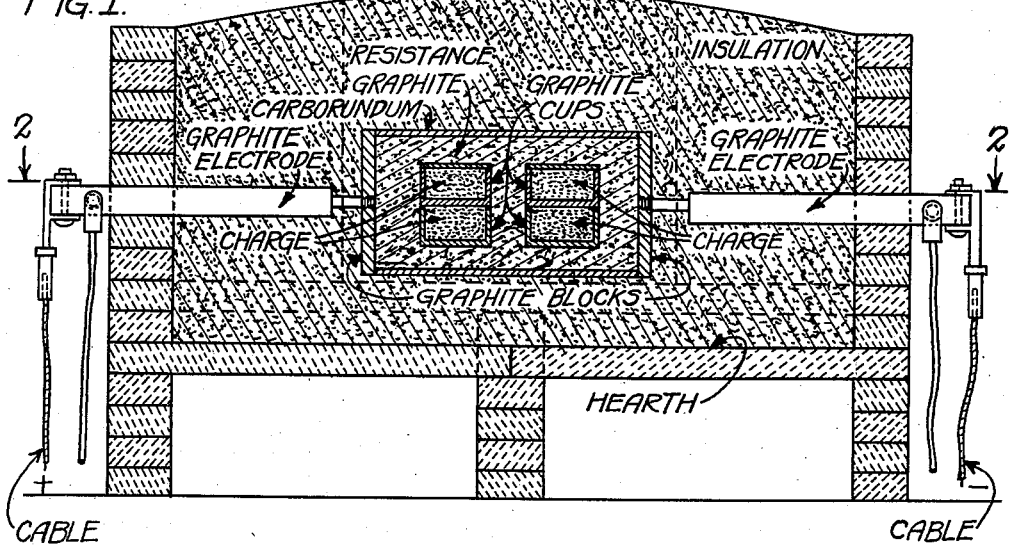
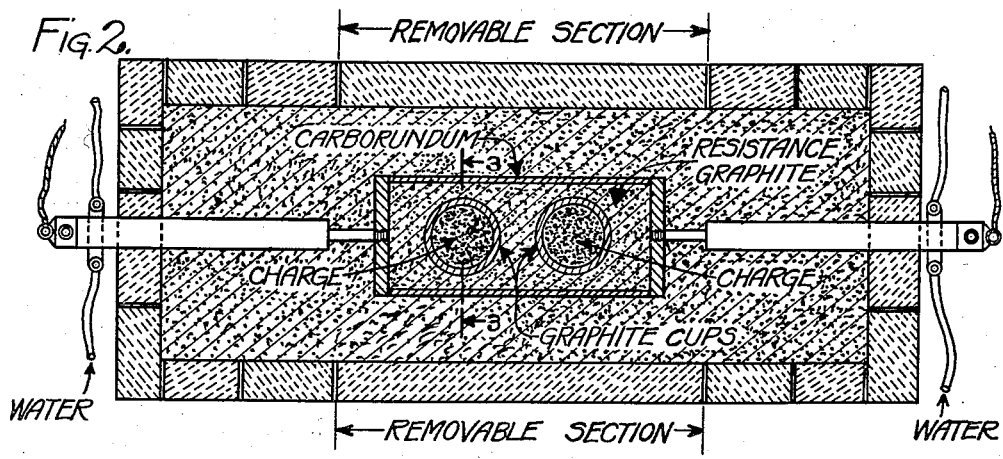
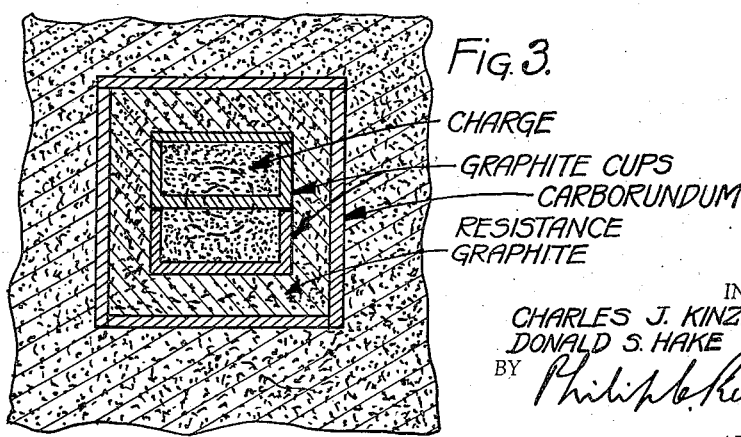
INVENTOR.
CHARLES J. KINZIE
DONALD S. HAKE
BY
ATTORNEY.

Patented Jan. 10, 1939

2,143,013

UNITED STATES PATENT OFFICE 2,143,013

ZIRCONIUM CARBOXIDE AND METHOD OF MAKING SAME

Charles J. Kinzie and Donald S. Hake, Niagara Falls, N. Y., assignors to The Titanium Alloy Manufacturing Company, New York, N. Y., a corporation of Maine Application August 7, 1935, Serial No. 35,041

9 Claims. (Cl. 23—203)

Our invention relates to the production of an improved zirconium oxide, more particularly a new crystalline zirconium oxide of a high degree of purity and of exceptionally low bulking weight and other advantageous properties, in the electric resistance furnace with the incidental production of silicon carbide as a by-product of the waste heat of the reaction.

Our invention consists primarily in the discovery that from zircon ($ZrSiO_4$), an essentially silicon-free crystalline zirconium oxide of exceptional purity may be made, while at the same time volatilizing essentially all the iron contained in the zircon. While accomplishing this result, there is also formed in the same furnace a substantial yield of silicon carbide, a portion of which may be the product of the silicon volatilized from the zircon, while the remaining portion of such silicon carbide is produced in the insulating mix consisting preferably of petroleum coke, silica sand and sawdust by the absorption of waste heat from the zirconium reaction zone or inner zone of the furnace.

Our invention especially involves the production of extremely fine zirconium oxide, free from silicon carbide and silicon compounds, which zirconium oxide contains about 0.10 per cent titanium oxide and about 0.01 per cent iron oxide. This new zirconium oxide is not only of extremely fine particle size but also its particles are crystalline with a refractive index of about 2.3 to 2.4. The major constituent is zirconium oxide of no apparent birefringence, the particles of which, under microscopic examination, consist of elongated prisms averaging about five to six times as long as the cross-section with no distinct cleavage being visible. Such zirconium oxide of exceptionally low bulking weight has unusual adsorbing properties, and due to the comparatively extended surfaces exposed is of great advantage wherever zirconia is employed as a catalyst or adsorbing agent in various chemical reactions in the chemical industry.

Heretofore in the production of zirconium oxide, science has had to depend upon various relatively complicated chemical separations involving preliminary fusions of zircon with alkali and subsequent treatments with acid and various other later steps, such as crystallization, in order to separate the zirconium oxide from combined and other impurities such as silica which is combined with zirconia in the zircon ($ZrSiO_4$).

Other impurities such as iron, titanium, rare earth compounds, etc., have also been separated from the zirconium-containing materials only by relatively complicated procedures.

According to our improved methods the zirconium-containing material is at no stage brought into solution, nor is the raw zirconium material decomposed or altered by the aid of fusion or other decomposing agents.

The product of our invention, if milled to suitable fineness without any other treatment, is an excellent opacifier pigment that is cream-colored, but is free from the defects of zirconium oxide produced by other electro-thermal processes, such as the presence of dark-colored blemish producing particles not removed by simple oxidation.

Our invention is based, in part, on the discovery that by heating zirconium silicate in the absence of carbon in an electric resistance furnace, the silicon compounds are completely volatilized, and in addition iron compounds are also volatilized so as to leave practically only a trace of same in the resultant zirconium oxide product.

Starting with a relatively pure zirconium silicate there is left a mass consisting of practically pure zirconium oxide. Upon ignition the mass does not change in volume and the small amount of carbon compound present is eliminated so as to leave the zirconium oxide as a cream-colored material.

In a companion case filed by us March 1, 1934 Serial No. 713,537, we have produced a substantially pure crystalline $ZrO_2$ which is a comparatively dense material that has approximately the following composition:

| | Per cent |
|---|---|
| Silicon (calculated as $SiO_2$) | Nil |
| Titanium (calculated as $TiO_2$) | 0.14 |
| Iron (calculated as $Fe_2O_3$) less than | 0.005 |
| Balance zirconium oxide + | 99.855 |
| | 100.00 |

Upon simple crushing or rubbing down this cream-colored friable mass was formed at −35 mesh aggregates in the form of a dense crystalline material.

According to the methods set forth in our said companion case Serial No. 713,537, practiced in the electric resistance furnace with the incidental production of silicon carbide as a by-product, we build up a hearth of suitable material, preferably of common firebrick, to serve as a supporting base for the furnace and its charge, the base having side and end walls to retain the charge.

Through each of the end walls there is a suitable opening for the placing of the graphite electrode, while all or part of the side wall of the furnace is built up of loose bricks to allow the free escape of evolved gases, and to allow dumping of the insulating material used around the charge. The bottom of furnace is preferably supported on piers to allow ample space for air to circulate, and the bottom should not be too tight, only tight enough to retain the insulation charge. There should be cracks or small openings in the bottom to allow of ready escape of evolved gases.

The furnace was loaded in the following materials:

An insulating mix is first prepared by mixing the following materials—

| | Parts by weight |
|---|---|
| Green petroleum coke | 37 |
| Silicon sand | 55 |
| Wood sawdust | 8 |
| | 100 |

Other forms of carbon may be used in place of petroleum coke such as coal or calcined coal in the form of foundry coke, if desired.

This mixture is charged upon the hearth of the furnace to a depth of about ten inches and leveled off, and then in center over an area of about fifteen inches by six inches a piece of thin tough paper was placed.

The graphite electrodes consist preferably of round one inch by twenty-six inch long pieces, one through each end wall, the exterior ends being suitably connected to the source of current, while the ends within the furnace are brought to within twelve inches of each other, leaving this twelve inch space for the placing of the granular graphite resistor. At each end of the round one inch graphite electrodes is a three inch by three inch by one inch block of graphite to confine the zones of various materials.

Sheets of thin tough paper were then arranged in place so as to form a zone one inch wide by three inches high between the electrodes and into this space granular graphite one-eighth inch mesh was placed.

Then sheets of thin tough paper were arranged, one on each side, one inch away from the sheets confining the granular graphite core, and these two spaces were filled with zircon sand of the following composition:

| | Per cent |
|---|---|
| Zirconium silicate (ZrSiO4) | 97.00 |
| Iron impurity (calculated as Fe2O3) | 0.15 |
| Titanium impurity (calculated as TiO2) | 0.20 |
| Balance free SiO2 and other materials | 2.65 |
| | 100.00 |

There was then arranged one inch away from the paper confining the zircon, other sheets of paper and in the space so formed is placed green petroleum coke. A piece of tough paper was then placed to cover the confined charge and the entire remaining space in the furnace was then filled with the mixture of coke, sand and sawdust as used at the bottom.

The graphite electrodes extend in through furnace wall and are connected outside with a suitable source of electric power, and are connected inside with a one inch wide by three inches high by twelve inches zone of granular graphite. At each side of this granular graphite core is a zone of zircon sand twelve inches long, one inch wide and three inches high. Outside the zircon zones are zones of petroleum coke twelve inches long, one inch wide and three inches high. The granular graphite core, the zircon and the coke are as a whole temporarily separated from the insulating mix at the bottom, sides and top by layers of paper, and at the ends by the contact blocks of graphite and also by paper.

The charge is therefore completely surrounded at the bottom, sides, top and ends with approximately twelve inch zone of this insulating charge. The source of power which we used was a laboratory transformer 12 kva. with a secondary voltage range of 2 to 45 volts in steps of 2 volts. A voltmeter and an ammeter were connected and used to measure terminal voltage and secondary current. The current was turned on and the run was of 6½ hours duration, using from 30 to 42½ secondary voltage and an average of about 280 amperes, which developed a temperature sufficiently high to dissociate the ZrSiO4 and volatilize the silicon as well as to form SiC in the adjacent zones of the furnace. The temperature probably is between about 2200 and 2700° C., probably about 2500° C. in the core.

As the run progressed, the carbon monoxide gas evolved was ignited at various points at the sides, ends and bottom of the furnace. The exterior of the furnace bottom hearth, walls, or top of the insulating mix were never much above room temperature, and the warmth at these points was mainly the result of the burning of carbon monoxide or other gases purposely ignited from the outside so as to convert same into harmless gases.

After 6½ hours, the current was turned off and furnace and its charge was allowed to cool for about 72 hours.

The top and side insulations were removed thereby exposing an envelope or shell of greenish colored crystals, which upon analysis proved to consist mainly of crystals of silicon carbide (SC), a well-known abrasive and refractory material.

Upon removal of this outer shell of silicon carbide, we found two zones of silicon carbide occupying the zones which formerly consisted of the layers of petroleum coke, this silicon carbide having been formed apparently by the silicon material as it was volatilized from the zircon, which silicon material combined with the coke to form silicon carbide.

In the zone originally filled with the zircon sand we found a friable gray-colored mass consisting of zirconium oxide containing a small amount of combined carbon, the carbon content by analysis being 0.10%.

This gray-colored mass upon calcination changed quickly to a cream-colored material without increasing or decreasing noticeably as regards volume, and without materially affecting the structure of the constituent zirconium oxide.

We do not wish to confine our methods of charging to that specifically described. For instance, the zircon may be placed below and above the core of granular graphite as well as at the sides.

The zircon may also be arranged in suitable containers such as paper or cardboard cartridges which are placed adjacent the core and are surrounded with coke. Graphite or carbon containers may likewise be used to hold the zircon charge, and may be simply removed and discharged after the reaction is over and the charge cooled.

We do not wish to confine ourselves to the use of granular carbon as the core material; any suitable conductor, such as graphite or carbon rods or mixture of same, may be used as the resistor with satisfactory results.

In case it is desired to burn out the small amount of carbonaceous material the furnace may be opened while charge is still hot and the small amount of carbon compounds allowed to oxidize in air of its own heat.

In the accompanying drawing showing a type of an electric resistance furnace in which our invention may be practiced—

Fig. 1 is a sectional elevation of the furnace and its contents;

Fig. 2 is a section taken on the line 2—2 of Fig. 1; and

Fig. 3 is an enlarged section taken on the line 3—3 of Fig. 2.

Referring to these Figs. 1 and 2, the hearth of any suitable material is supported on piers, the hearth forming a supporting base for the furnace and its charge. Such base has also side and end walls to hold the charge. Through each of the end walls is suitable opening for arranging the graphite electrodes, while the sidewalls of the furnace are built up of loose bricks to permit the free escape of evolved gases with cracks or openings also formed in the bottom which is raised for ample air circulation.

The following example will show how our methods are practiced in this furnace by which our novel and improved crystalline zorconium oxide is produced.

The furnace as shown was loaded in the following manner:

An insulating mix is first prepared by mixing the following materials—

| | Parts by weight |
|---|---|
| Green petroleum coke | 37 |
| Silicon sand | 55 |
| Wood sawdust | 8 |
| | 100 |

Other forms of carbon may be used in place of petroleum coke, such as coal or calcined coal in the form of foundry coke, if desired.

This mixture is charged upon the furnace hearth to a depth of about ten inches and leveled off. The graphite electrodes consist preferably of round one inch by twenty-six long pieces, one through each end wall, the exterior ends being suitably connected to the source of current by cables (Figs. 1 and 2), while the inner ends are connected to two upright graphite blocks that are spaced twenty-six inches from each other. Between the graphite blocks are placed four separate envelopes of less than 1/8 inch carborundum in layers of one-half inch thickness to form the top, bottom and sides of the compartment surrounding the resistance graphite of one-eighth particle size that envelopes the charge to be treated.

Outside the furnace the ends of the graphite electrodes may be cooled by passing a current of water through them as shown in Figs. 1 and 2.

A charge was prepared by intimately mixing 905.1 grams of the calcined substantially pure crystalline $ZrO_2$ which we have described as a comparatively dense material having approximately the following composition:

| | Per cent |
|---|---|
| Silicon (calculated as $SiO_2$) | Nil |
| Titanium (calculated as $TiO_2$) | 0.14 |
| Iron (calculated as $Fe_2O_3$) less than | 0.005 |
| Balance zirconium oxide + | 99.855 |
| | 100.00 | with 452.5 grams of petroleum coke. Both constituents of this mixture were crushed to form −35 mesh aggregates and thoroughly mixed.

The product mixed with the coke may be the uncalcined product of our companion case Serial No. 713,537 that is a friable gray-colored mass crushed to −35 mesh with a carbon content of about 0.10 percent with the balance substantially zirconium oxide.

This well-mixed charge was loaded into four carbon cups or saggers, each being one and one-half inches deep and four inches in diameter, the cups being arrayed in spaced-apart pairs in the furnace as shown.

The top cup superposed on the lower serves as a cover for the latter with the top cup covered by a graphite plate (Figs. 1 and 3).

The charge as so formed is completely surrounded at the bottom, sides, top and ends with approximately twelve inch zones of this insulating charge. The source of power for this example was a laboratory transformer 12 kva with a secondary voltage range of 2 to 45 volts in steps of 2 volts. A voltmeter and an ammeter were connected and used to measure terminal voltage and secondary current.

The run was started at 9:40 a. m. and was completed at 3:00 p. m. on the same day. At the beginning the voltage was 39 but dropped to between 22 and 26 volts by noon and remained in the range of 22 to 25 volts during the balance of the run.

As the run progressed, the carbon monoxide gas evolved was ignited at various points at the sides, ends and bottom of the furnace. The exterior of the furnace bottom hearth, side walls, or top of the insulating mix were never much above room temperature, since the warmth at these points was mainly the result of the burning of carbon monoxide or other gases purposely ignited from the outside so as to convert same into harmless gases.

The amperage was 112 at the start, 720 by noon and remained within the range of 600 to 783 throughout the balance of the run. The power was turned off at 3 p. m., and the furnace allowed to cool for about 72 hours and then unloaded.

The four cups or saggers contained 921.3 grams of dark gray granular material which we found upon analysis to have approximately the following composition:

| | Per cent |
|---|---|
| Zirconium, calculated at Zr | 72.69 |
| Titanium, calculated as Ti | 0.10 |
| Iron, calculated as Fe | 0.01 |
| Silicon, calculated as Si | 0.13 |
| Carbon, calculated as C | 19.81 |
| Oxygen | 7.26 |
| | 100.00 |

The small silicon content is derived from the coke used in the mix.

Microscopically this material appeared to be a homogeneous, optically opaque substance which is manifestly some compound in which zirconium, carbon and oxygen are chemically combined, but careful examination under the high power petrographic microscope failed to show the presence of zirconium oxide.

We then calcined this product at 1500° F., when it oxidized with glowing and expanded several times in volume to form 904 grams of exceptionally fine zirconium oxide, free of silicon carbide and silicon compounds and containing about 0.10 per cent titanium oxide and about 0.01 per cent iron oxide.

This zirconium oxide in a state of extreme fineness was optically different from that calcined zirconium oxide in the form of a glass (presumably vitreous ZrO₂) described in our pending application Serial No. 713,536 filed March 1, 1934, in that the particles of the instant case though extremely fine, are crystalline with an index of refraction of about 2.3 to 2.4.

This novel form of zirconium oxide is unique in that it is far lower in bulking weight than any crystalline zirconium oxide with which we are familiar.

In the following table the calcined or oxidized zirconium carboxide of this instant case is compared in dry bulk characteristics with several other types of zirconium oxide.

| | Pounds per cu. ft. dry bulk |
|---|---|
| ZrO₂ of this case | 38 |
| ZrO₂ from oxidation of zirconium cyanonitride (Barton Patent No. 1,342,084) | 83 |
| ZrO₂ obtained from our application Serial No. 713,537 | 145 |

The 38 pounds per cu. ft. of this zirconium oxide which we have discovered and developed had the following composition by chemical analysis:

| | Per cent |
|---|---|
| ZrO₂ | 99.39 |
| SiO₂ | Nil |
| TiO₂ | 0.10 |
| Fe₂O₃ | 0.01 |
| Others | 0.50 |
| | 100.00 |

As this analysis shows, the major constituent is a zirconium oxide which we found to have no apparent birefringence, the particles of which consists of elongated prisms averaging the length five or six times their cross-section with no distinct cleavage being observed.

Due to the exceptionally low bulking characteristics of this new zirconium oxide, it is indicated that various wares of ZrO₂ may be produced at considerably lower cost than heretofore, particularly wares not required to stand excessively high temperatures, since we observed that upon heating to 3250° F., this material shrinks and is converted to a dense ZrO₂ form.

Ware made of this light low bulking ZrO₂ should prove useful wherever ZrO₂ is required for catalytic purposes in form of fabricated shapes not subjected to temperatures sufficiently high to cause shrinkage which we have mentioned.

This new type of zirconium oxide has peculiar adsorbtive property. Due to the peculiarly vast surfaces exposed, it should be ideal wherever zirconium oxide is used or considered as a catalyst or adsorbing agent in the chemical industry and in chemical reactions.

We claim as our invention:

1. A zirconium-carbon-oxygen intermediate characterized as being a homogeneous, friable, optically opaque, dark gray granular compound of no definite crystalline structure composed of zirconium about 72%, carbon about 20%, and oxygen about 7%, all in chemical combination free from zirconium oxide, and with less than ½ of 1% of titanium, iron and silicon compounds.

2. In the method of converting a dense crystalline zirconium oxide into a granular homogeneous zirconium carboxide free from zirconium oxide, the step which consists in heating a mixture of said dense crystalline zirconium oxide containing substantially 99% ZrO₂ and carbon enveloped in a resistance mix containing carbon as the resistor in an electric resistance furnace without fusion, but with substantial decomposition of the charge to produce a gray granular material of no definite crystalline structure composed of zirconium about 72%, carbon about 20%, and oxygen about 7%, all in chemical combination, free from zirconium oxide, and also containing less than ½ of 1% of titanium, iron and silicon compounds.

3. In the method of converting a dense crystalline zirconium oxide into a granular homogeneous zirconium carboxide free from zirconium oxide, the step which consists in heating a mixture of said dense crystalline zirconium oxide containing substantially 99% ZrO₂ and carbon in the ratio of about 2 to 1, parts by weight, enveloped in a resistance mix containing carbon as the resistor in an electric resistance furnace without fusion, but with substantial decomposition of the charge to produce a gray granular material of no definite crystalline structure composed of zirconium about 72%, carbon about 20% and oxygen about 7%, all in chemical combination, free from zirconium oxide, and also containing less than ½ or 1% of titanium, iron and silicon compounds.

4. In the method of converting a dense crystalline zirconium oxide into a granular homogeneous zirconium carboxide free from zirconium oxide, the step which consists in heating a mixture of said dense crystalline zirconium oxide containing substantially 99% ZrO₂ and carbon in the ratio of about 2 to 1, parts by weight, all in finely divided form, enveloped in a resistance mix containing carbon as the resistor in an electric resistance furnace without fusion, but with substantial decomposition of the charge to produce a gray granular material of no definite crystalline structure composed of zirconium about 72%, carbon 20% and oxygen about 7%, all in chemical combination, free from zirconium oxide, and also containing less than ½ of 1% of titanium, iron and silicon compounds.

5. In the method of converting a dense crystalline zirconium oxide essentially free from silicon with not over 0.20% titanium and traces of iron compounds as an impurity therein into a granular homogeneous zirconium carboxide free from zirconium oxide, the step which consists in heating a mixture of said dense crystalline zirconium oxide containing substantially 99% ZrO₂ and carbon enveloped in a resistance mix containing carbon as the resistor in an electric resistance furnace without fusion, but with substantial decomposition of the charge to produce a gray granular material of no definite crystalline structure composed of zirconium about 72%, carbon about 20%, and oxygen about 7%, all in chemical combination, free from zirconium oxide, and also containing less than ½ of 1% of titanium, iron and silicon compounds.

6. In the method of converting a dense crystalline zirconium oxide essentially free from silicon with not over 0.20% titanium and traces of iron compounds as an impurity therein into a granular homogeneous zirconium carboxide free from zirconium oxide, the step which consists in heating a mixture of said dense crystalline zirconium oxide containing substantially 99% ZrO₂ and carbon in the ratio of about 2 to 1, parts by weight, enveloped in a resistance mix containing carbon as the resistor in an electric resistance furnace without fusion, but substantial decomposition of the charge to produce a gray granular material of no definite crystalline structure composed of zirconium about 72%, carbon about 20% and oxygen about 7%, all in chemical combination, free from zirconium oxide, and also containing less than ½ of 1% of titanium, iron and silicon compounds.

7. In the method of converting a dense crystalline zirconium oxide essentially free from silicon with not over 0.20% titanium and traces of iron compounds as an impurity therein into a granular homogeneous zirconium carboxide free from zirconium oxide, the step which consists in heating a mixture of said dense crystalline zirconium oxide containing substantially 99% $ZrO_2$ and carbon in the ratio of about 2 to 1, parts by weight, all in finely divided form, enveloped in a resistance mix containing carbon as the resistor in an electric resistance furnace without fusion, but with substantial decomposition of the charge to produce a gray granular material of no definite crystalline structure composed of zirconium about 72%, carbon about 20% and oxygen about 7%, all in chemical combination, free from zirconium oxide, and also containing less than ½ of 1% of titanium, iron and silicon compounds.

8. In the method of converting a dense crystalline zirconium oxide into a granular homogeneous zirconium carboxide free from zirconium oxide, the step which consists in heating a mixture of said dense crystalline zirconium oxide containing substantially 99% $ZrO_2$ and carbon contained in carbon saggers enveloped in a resistance mix containing carbon as the resistor in an electric resistance furnace without fusion, but with substantial decomposition of the charge to produce a gray granular material of no definite crystalline structure composed of zirconium about 72%, carbon about 20% and oxygen about 7%, all in chemical combination, free from zirconium oxide, and also containing less than ½ of 1% of titanium, iron and silicon compounds.

9. In the method of converting a dense crystalline zirconium oxide into a granular homogeneous zirconium carboxide free from zirconium oxide, the step which consists in heating a mixture of said dense crystalline zirconium oxide containing substantially 99% $ZrO_2$ and carbon in the ratio of about 2 to 1, parts by weight, contained in carbon saggers enveloped in a resistance mix containing carbon as the resistor in an electric resistance furnace without fusion, but with substantial decomposition of the charge to produce a gray granular material of no definite crystalline structure composed of zirconium about 72%, carbon about 20% and oxygen about 7%, all in chemical combination, free from zirconium oxide, and also containing less than ½ of 1% of titanium, iron and silicon compounds.

CHARLES J. KINZIE.
DONALD S. HAKE.